United States Patent [19]
Sidor et al.

[11] 4,099,164
[45] Jul. 4, 1978

[54] SENSORS FOR SENSING A PLURALITY OF PARAMETERS

[75] Inventors: Edward F. Sidor, Lombard, Ill.; Charles C. Camillo, La Jolla, Calif.; Glenn W. Bowen, Northbrook, Ill.

[73] Assignee: Illinois Tool Works Inc., Chicago, Ill.

[21] Appl. No.: 772,807

[22] Filed: Feb. 28, 1977

Related U.S. Application Data

[62] Division of Ser. No. 668,093, Mar. 18, 1976.

[51] Int. Cl.$^2$ .............................................. G08C 19/06
[52] U.S. Cl. .................................... 340/197; 73/736; 336/110; 336/132
[58] Field of Search ......................... 340/195, 196, 197; 73/344, 362 R, 362 CP, 398 R; 336/110, 132; 365/62; 324/224, 200, 207, 208; 361/139, 140, 158

[56] References Cited

U.S. PATENT DOCUMENTS

| | | | |
|---|---|---|---|
| 3,091,122 | 5/1963 | Pike et al. | 73/398 R |
| 3,805,617 | 4/1974 | Kamazuka | 73/398 R |
| 3,848,180 | 11/1974 | Jonke et al. | 73/398 R |
| 3,950,993 | 4/1976 | Sidor | 340/197 |
| 3,958,202 | 5/1976 | Sidor | 340/197 |
| 3,958,203 | 5/1976 | Bernin | 340/197 |
| 4,045,787 | 8/1977 | Sidor et al. | 340/197 |
| 4,064,497 | 12/1977 | Sidor et al. | 340/197 |

*Primary Examiner*—John W. Caldwell, Sr.
*Assistant Examiner*—James J. Groody
*Attorney, Agent, or Firm*—Glenn W. Bowen; Robert W. Beart

[57] ABSTRACT

Sensors, or transducers, which utilize elongated magnetically saturable tubes with sense lines that run through the tubes for simultaneous sensing of a plurality of parameters are disclosed. One version involves a single sensing element which has a first pair of diametrically disposed magnetic poles responsive to one condition that is positioned adjacent to one end of the tube and a second pair of diametrically disposed magnets responsive to another condition that is positioned adjacent to the other end of the tube. Another version involves two elements which have temperature vs. inductance characteristics which intersect, and a pair of diametrically disposed magnets responsive to another condition positioned adjacent the two elements.

2 Claims, 9 Drawing Figures

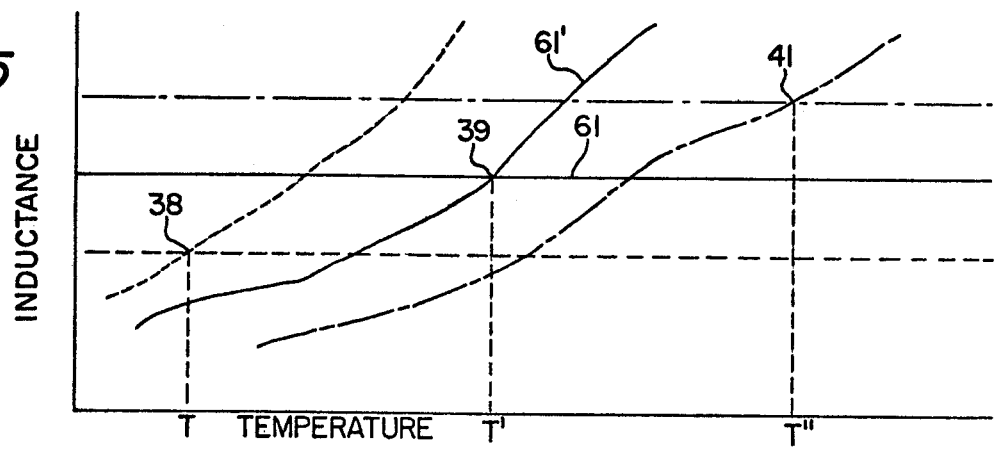
Fig. 5
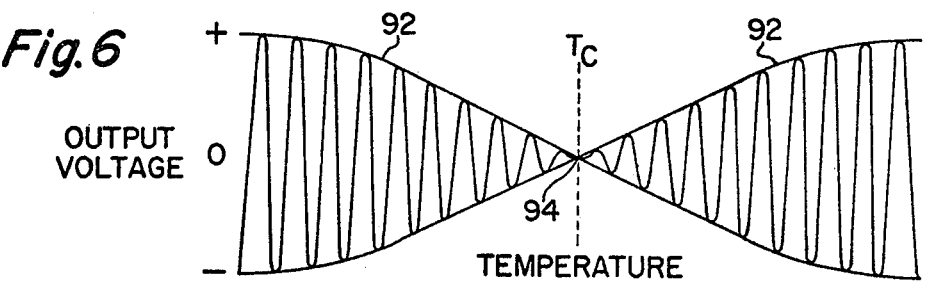
Fig. 6
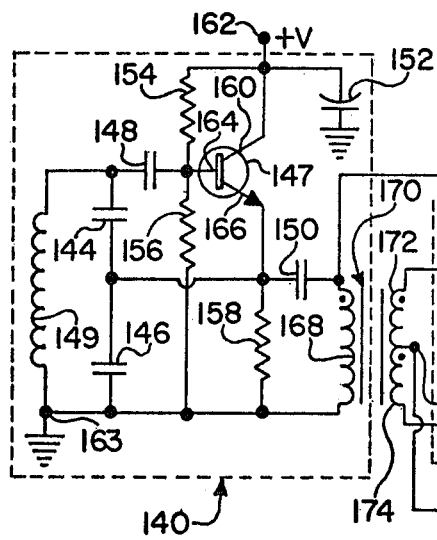
Fig. 7
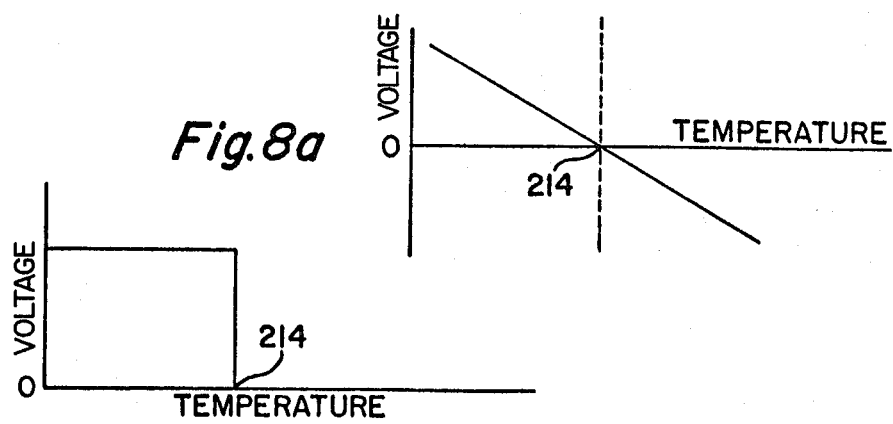
Fig. 8a
Fig. 8b

SENSORS FOR SENSING A PLURALITY OF PARAMETERS

This is a division of application Ser. No. 668,093, filed Mar. 18, 1976.

BACKGROUND OF THE INVENTION

A very useful positional transducer is disclosed in U.S. Pat. No. 3,958,203, issued May 18, 1976, in the name of Victor M. Bernin, which is entitled "Positional Transducer Utilizing Magnetic Elements" and is assigned to the assignee of the present invention. This transducer utilizes an elongated, hollow, cylindrical tube of a magnetically saturable material, a sense line that runs through the tube parallel to its elongated axis and a pair of elongated, generally rectangularshaped magnets of opposite polarity which have a length that is preferably no greater than the length of the tube and which are positioned adjacent diametrically opposite exterior portions of the tube. As the magnets move over the tube, they provide substantially complete saturation of the tube in the portion of the tube over which they extend, while the remaining portion of the tube remains substantially unsaturated. The transducer thereby gives a linear indication of the position of the magnets with respect to the tube when an electrical AC signal or a pulse signal is supplied either directly, or through magnetic coupling from a drive line, to the sense line that runs through the tube.

The use of a ferrite element that is of a toroidal shape and is positioned between two saturating magnets to produce an output signal on a sense line that runs through the core is disclosed in U.S. Pat. No. 3,638,221, issued in the name of Victor M. Bernin on Jan. 25, 1972, and assigned to the assignee of the present invention. The apparatus of the Bernin patent is a keyboard switch in which the entire toroidal core is completely saturated when the magnets are lowered on a keystem into the vicinity of the cores. In order to accomplish the purposes of the Bernin patent, the core of the switch of that patent is positioned so that its axis is parallel to the wide part of the magnets, which are of a substantially greater dimension than is the thickness of the core.

The transducer of the Bernin U.S. Pat. No. 3,958,203 by contrast, uses a hollow, elongated, cylindrical tube constructed of a material which is magnetically saturable, a sense wire that runs through the tube, and two oppositely poled magnets that move along the outside of the tube in order to provide an accurate linear indication of the position of the magnets with respect to the tube on the sense line. In other words, this transducer does not provide a "1" or a "0" output signal, but instead it may be used to accurately determine the position of the saturating magnets with respect to the tube, since the portion of the elongated tube that lies between the magnets is relatively saturated while the remaining portion is relatively unsaturated.

A number of advantages are thereby realized. Because the tube provides a closed flux path, there is no substantial fringing effect at the ends of the saturating magnets; and, therefore, the portion of the tube that is not between the magnets may remain substantially unsaturated. Since the output signal that is provided on the sense wire through the tube is not dependent upon the magnetic characteristics of the tube, but merely upon the position of the magnets with respect to the tube, a very linear output signal is achieved. In addition, problems that affect magnetic sensors that depend on partial saturation of the sensing element, such as temperature variation and aging variation, are also eliminated. Moreover, the magnetic force that is required to operate this type of transducer is not critical because of reliance on saturation of the tube between the magnets to produce the output signal. This is in direct contrast to sensing devices such as those shown in the McAdam U.S. Pat. No. 2,915,637, where the magnetic saturation of the entire toroidal core is affected by the position of the adjacent magnet; and, thus, the McAdam core is subject to the previously mentioned temperature and aging defects; and the device has a critical magnetic force requirement for the control magnet.

Temperature sensors utilizing a pair of elongated magnetically saturable tubes are disclosed, U.S. Pat. No. 3,950,993, issued Apr. 20, 1976, in the name of Edward F. Sidor, which is entitled, "Temperature Sensors with Improved Operating Characteristics Utilizing Magnetic Elements," and which is assigned to the assignee of the present invention. A plot of inductance vs. temperature for the two elements, thus, provides curve which intersect at the temperature which is to be sensed. Permanent magnets are positioned adjacent the temperature sensing elements in order to provide a mechanism for adjusting the cross-over temperature point of the magnetic elements.

Magnetic cores, such as toroidal-shaped cores, have been previously used for temperature sensing. The prior art methods of temperature sensing utilized transition characteristics of the magnetic core such as the Curie temperature transition and/or first order transitions such as those described in U.S. Pat. No. 3,534,306; issued on Oct. 13, 1970, in the name of Watrous et al. Prior temperature sensing devices of this type relied on the fact that at a certain temperature a drastic change of the magnetic characteristics of the core would occur. Thus, if a wire were wound around the core to form an inductance element, the inductance of the element would change drastically when the predetermined temperature was reached. This required specific core materials that were specially formulated and carefully controlled in order to provide the desired rapid transition at the exact temperature that was desired. A different specially manufactured magnetic core would then have to be substituted in the sensor in order to sense another temperature.

The sensing device of the Sidor U.S. Pat. No. 3,950,993, by contrast, did not depend upon any rapid change of inductance state of a magnetic core. Instead, the inductance of the magnetic elements varied in a gradual manner until the inductance of both elements is approximately equal at a predetermined temperature which is then sensed by the sensing circuit. The advantage of this approach over the prior art devices is that by changing the inductance of the element by changing the number of windings coupled to it, the cross-over point where the two inductances are equal may be changed so that the temperature sensor may be used over wide range temperatures.

The temperature sensor of Sidor U.S. Pat. No. 3,950,993, is achieved by coupling the two inductively wound elements having different inductance vs. temperature characteristics into a four-arm AC inductance bridge circuit having two terminals that are connected to a conventional null detector. When the inductance vs. temperature characteristics of the two elements cross at a predetermined temperature, the inductances are equal; and the null detector indicates that the desired temperature has been reached. Although two magnetic cores have been connected in series to achieve temperature compensation, as is shown in U.S. Pat. No. 3,824,502; issued on July 16, 1974, to Bardash et al, the utilization of two series connected magnetic elements that have different temperature characteristics for sensing temperatures over a relatively large range of temperatures without a transition change of the magnetic state of the element was not achieved by the device of the Bardash et al patent.

In co-pending U.S. patent application Ser. No. 625,784 filed Oct. 24, 1975, now abandoned, and entitled "Two-Core Magnetic Temperature Sensor," filed in the name of Edward F. Sidor, and assigned to the assignee of the present invention, a temperature sensing circuit utilizing two magnetic cores is described. This application is a continuation of prior U.S. patent application Ser. No. 533,364, filed Dec. 16, 1974, and now abandoned. In this circuit, the two cores were connected into a bridge circuit with two other impedances and were coupled to a sensing circuit, such as a null detector, in order to sense the temperature vs. inductance cross-over point at which the inductance of the two cores became equal. As noted above, one advantage of this tupe of device was that by changing the inductance of the device, the temperature cross-over point could easily be varied; and the temperature sensor could be used over a wide range of temperatures. The prior application contemplated change of inductance by means of varying the number of windings wound on the cores of the two sensing elements. This approach, however, was time consuming since it required disassembly of the sensing unit.

The temperature sensor of the Sidor application allows for the adjustment of the temperature cross-over point by movement of one or more permanent magnets which are positioned adjacent the magnetic sensing elements, so that by adjustment of the position of the movable magnets, the permeability of the magnetic elements may be adjusted in order to vary the temperature cross-over point without disassembly of the circuit.

A further advantageous feature of the temperature sensor of the Sidor application is that either toroidal-shaped cores or elongated tubular magnetic elements, in which the winding consists of the wire that passes substantially along the axis of the tubular element, may be employed. By making the core elongated and tubular in shape, and by making the length of the permanent magnets so that they are somewhat shorter than the length of the tubular elements, a more precise control is achieved because the amount of saturation of the tubular elements can be closely controlled by positioning of the permanent magnet. This is accomplished by selectively, magnetically saturating a predetermined portion of the elongated magnetic elements.

In addition to employment of a single pair of magnetic elements in a two-arm active bridge circuit, two pairs of magnetic elements may be connected to form a four-arm active bridge circuit which is twice as sensitive as a two-arm active bridge circuit as described in the Sidor U.S. Pat. No. 3,950,993.

The previously described sensors, or transducers, of the Bernin U.S. Pat. No. 3,958,203, and the Sidor Application U.S. Pat. No. 3,950,993 were extremely valuable for applications that required the sensing of a single condition such as temperature, or pressure or position, etc. However, in applications which require that more than one condition be sensed to satisfy a given control function, a different sensor of these types must be used for each condition to be sensed, thereby increasing the cost and the size of the sensing unit.

It is the object of the present invention to retain the advantages of the sensors, or transducers, of the Bernin and Sidor applications while combining a plurality of sensing functions into a single sensor, thereby providing a sensor of reduced cost and size but of increased utility.

DESCRIPTION OF THE DRAWINGS

The present invention is illustrated by reference to the drawings in which:

FIG. 5 is a plot of inductance vs. temperature for the elements of FIG. 3 and FIG. 4; and FIG. 6 is a diagramatic showing of the modulated output wave form that may be derived from the elements of FIG. 3 and FIG. 4;

FIG. 7 is a schematic diagram which shows a circuit with a differential amplifier output and a synchronous detector which is utilizable with the sensors of FIG. 3 and FIG. 5;

FIG. 8a is a graph which shows the output voltage vs. temperature at the terminal 200 of the circuit of FIG. 7; and FIG. 8b is a graph of the output voltage vs. temperature at the terminal 212 of the circuit of FIG. 7.

TECHNICAL DESCRIPTION OF THE INVENTION

Figure 1:
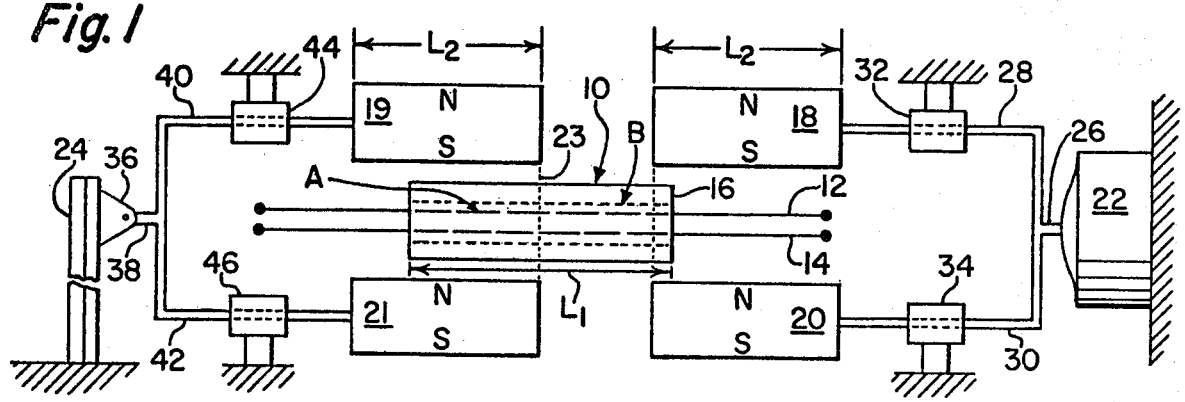
FIG. 1 is a side view of a single element which is responsive to the two separate parameters of temperature and pressure.

The saturable magnetic elements of the present invention are highly linear, contactless, very accurate, reliable, capable of functioning in severe environments and are relatively low in cost. The manner in which these elements are constructed is shown in FIG. 1; which shows an elongated element such as hollow tube 10 that may be constructed of a ferrite, or other suitable material, which is capable of being magnetically saturated, or effected in some manner. If an inductive version of the transducer is desired, a single sense wire 12 may pass through the tube parallel to the elongated axis of the tube. Alternatively, a drive wire 14 could also be inserted into the tube 10 that would be supplied with electrical current pulses in order to provide transformer action between the drive wire 14 and the sense wire 12. By use of the cylindrical hollow tube 10, a closed magnetic flux path is provided around the sense wire 12 through the walls 16 of the tube 10.

The actual length of the tube 10 is dependent upon the type and the accuracy of sensing that is desired. In general, however, the elongated dimension $L_1$ of the tube will on the order of at least ten times the thickness of conventional toroidal cores that are commercially available for magnet memory core application and will generally be over one inch if relatively accurate sensing is required.

The elongated dimension $L_2$ of the magnet pairs 18, 20 and 19, 21 is preferably slightly shorter than the length $L_1$. The longer the tube 10 relative to the length of the magnets, the more highly accurate the sensing device becomes. The relative position of the pairs of magnets 18, 20 and 19, 21, which are oppositely poled with respect to the other magnet of the pair and which are adjacent the exterior of the periphery of the walls 16 determines the output signal that appears in the sense wire 12. As the magnet pairs 18, 20 and 19, 21 travel from the left and the right, as viewed in FIG. 1, they will substantially saturate a greater or lesser volume of the tube 10. In the position shown in FIG. 1, the portion A of the tube 10 between the magnets 19, 21 will be substantially saturated, (i.e., a further increase in magnetic field will produce no substantial decrease in inductance of the tube), while the portion B outside of the magnet pair 19, 21 will be substantially unsaturated. Although there will be some degree of saturation in the vicinity of the boundary lines 23 between portions A and B, this will be relatively small because of the close proximity of the magnets 19, 21 to each other and because of the closed magnetic flux path provided by the walls 16.

As the magnet pairs 18, 20 and 19, 21 move to the left or the right over the tube, a respective different amount of the volume of the tube will be magnetically saturated so as to give an indication on the sense line of the relative position of the tube 10 with respect to the magnet pairs 18, 20 and 19, 21. Since each portion of the tube is either completely saturated or is substantially unsaturated, the device is virtually free from temperaure and aging effects and it does not require a critical magnetic force, as would be the case if the entire structure of the tube 10 were partially magnetically saturated by the magnet pairs 18, 20 or 19, 21. Thus, the tube 10 can be saturated incrementally with a high degree of magnetic resolution and control. To achieve this result, there must be a high ratio of the length $L_1$ of the tube 10 to its diameter so that the small air gap between the magnet pairs 18, 20 and 19, 21 and the wall 16 results in a more confined and controllable flux configuration so that the element is not flux density sensitive.

The tube 10 may be extruded resulting in a high uniformity of cross-sectional area which contributes to accuracy of the element. Also, since inductive windings are not wound about the tube 10, the magnet pairs 18, 20 and 19, 21 may be placed close to the wall 16 and a small wall thickness of the wall 16 contributes to high magnetic resolution also.

The tube 10 and sense line 12 of FIG. 1 operate to provide output signal which is a function of two independent parameters, for example, pressure and temperature, or two different temperatures. This is achieved by coupling the first pair of magnets 18, 20 to a conventional pressure responsive device if pressure is to be sensed. For example, the pressure or temperature, device 22 which expands in volume when the ambient pressure increases and which contracts in volume when the ambient pressure decreases; and by coupling the second pair of magnets 19, 21 to a temperature responsive device, for example, the bi-metallic strip 24 which responds to changes in ambient temperature by deflecting in a first direction or in the opposite direction according to whether the temperature is above or below a predetermined value.

The pressure responsive device is connected to a bifurcated coupling member 26 which has one arm 28 but is connected to the magnet 18 and a second arm 30 that is connected to the magnet 20. The arm 28 is supported by the support brace 32, while the arm 30 is supported by the support brace 34 so that the magnets 18, 20 move back and forth with respect to the tube 10 in a linear manner at substantially a constant distance from the outer periphery of the wall 16.

The temperature responsive bimetal 24 is connected to a bracket 36 which in turn is connected to a bifurcated coupling member 38, which has one arm 40 that is connected to the magnet 19 and a second arm 42 that is connected to the magnet 21. The arm 28 is supported by the support brace 44, while the arm 42 is supported by the support brace 46 so that the magnets 19, 21 move back and forth with respect to the tube 10 in a linear manner at substantially a constant distance from the outer periphery of the wall 16.

The pressure responsive device 22 and the temperature responsive bimetal 24 may be connected so that increasing magnitude of the associated quantity can cause the related pair of magnets 18, 20 or 19, 21 to move in either direction, according to the conditions that are imposed; for example, it may be desirable to provide an output signal that is a function of the product of the two parameters, or alternately, one that is a function of the ratio of the two parameters. For example, if the pressure responsive device 22 expands to move the pair of magnets 18, 20 to the left, as viewed in FIG. 1, with increasing ambient pressure and to the right with decreasing ambient pressure and the bimetal 24 deflects to move the pair of magnets 19, 21 also to the left with increasing ambient temperature and to the right with decreasing ambient temperature, the output signal of the sensor may be a function of the ratio of the pressure to the temperature. This is because an increased amount of volume of the tube 10 is saturated due to an increased ambient pressure while a decreased amount of volume of the tube 10 is saturated due to an increased ambient temperature. This type of sensor may thus be used in gaseous environments with conventional processing circuitry (not shown) to provide an electrical signal that represents the number of mols of gas that are present in a given volume in accordance with the definition:

$$n = (V)/(R) \cdot (P)/(T)$$

where $V$ is volume, $P$ is pressure, $T$ is temperature, $R$ is the universal gas constant and $n$ is the number of mols of gas present with R and V being constant in value.

Figure 2:
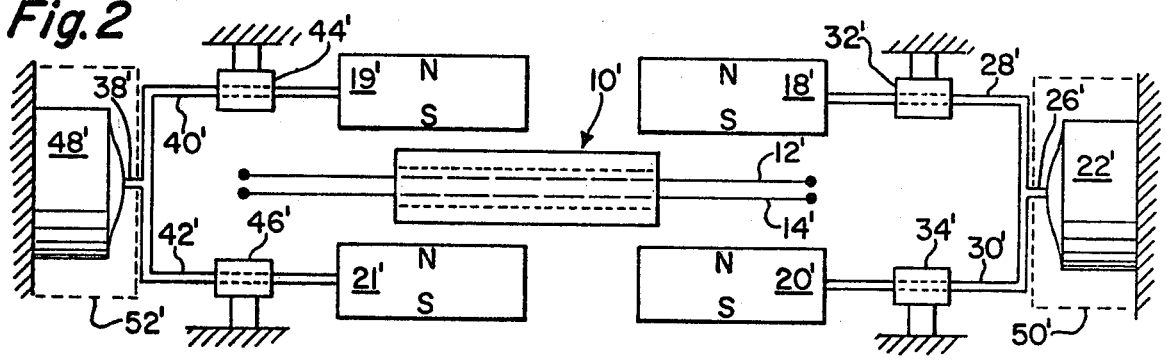
FIG. 2 is a side view of a single element which is responsive to the two separate pressure parameters.

Another version of a sensor in accordance with the present invention which utilizes only one magnet tube is shown in FIG. 2. In this version, the description of the component parts that are labelled with a prime mark (such as tube 10') is identical to that for the corresponding unprimed component (such as tube 10) of FIG. 1. The magnet pair 18', 20' are again controlled by a pressure responsive device 22' which causes the magnets 18', 20' to move to the left with increasing ambient pressure. The pressure responsive device 48' on the other hand may be connected so this increasing ambient pressure causes the magnet pair 19', 21' to move to the left.

If the pressure responsive device 22' is housed in one area 50' and the pressure responsive device 48' is housed in a second area 52', the sensing element comprising the tube 10', the sense line 12' and the magnet pairs 18', 20' and 19', 21' will provide an output signal that is a function of the ratio of the ambient pressure in the area 50' to the ambient pressure in the area 52'.

Figure 3:
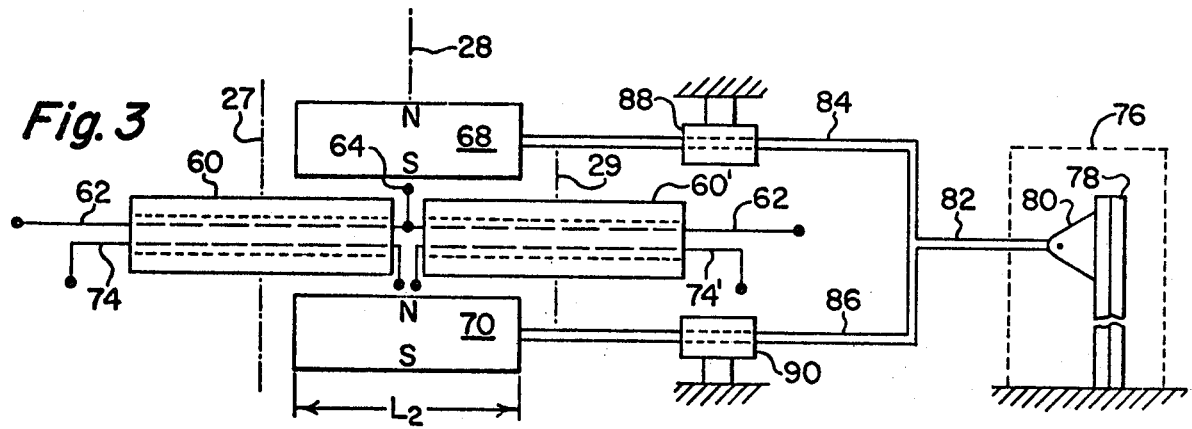
FIG. 3 is a side view of a two element sensor which is responsive to two separate temperatures.
Figure 4:
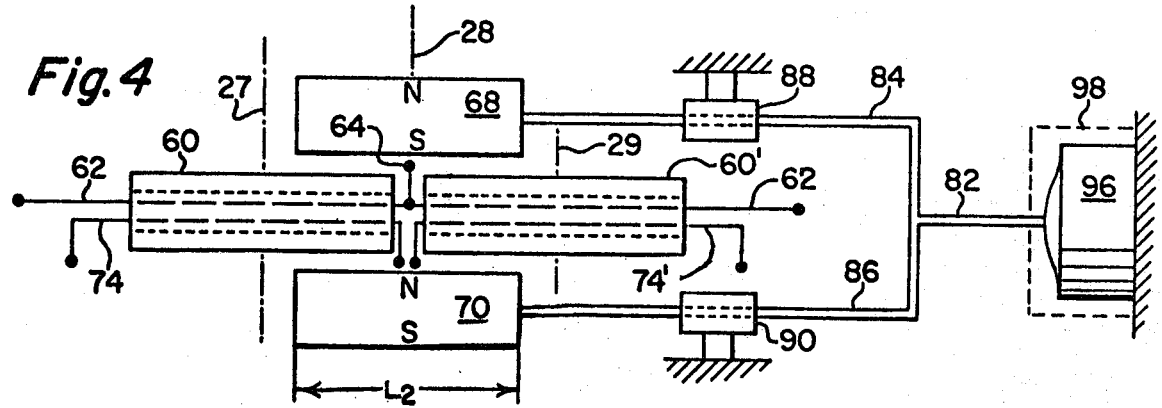
FIG. 4 is a side view of a two element sensor which is responsive to temperature and to another parameter, such as pressure.

The embodiments of FIGS. 3 and 4 show configurations in which a first magnetic tube 60 is positioned near a second magnetic tube 60' so that the axes of the elongated dimensions of the tubes are aligned. The sense wire 62 through the tube 60 and the sense wire 62' through the tube 60' are connected together at their inner ends to form the terminal 64, whereby a three-terminal output device which is utilizable as a differential potentiometer is provided. As the magnets 68, 70 move over the tubes 60, 60', various portions of the respective tubes become saturated and unsaturated. Like the embodiments of FIGS. 1 and 2, the device of FIG. 3 may be converted to a transformer type device merely by the addition of the drive lines 74, 74' which are not used in the inductor version.

When only the sense wire is employed in the device of FIG. 3 and it is used as an inductor sensing element, an AC excitation sine wave signal may be used. Excitation is generally from a current source so that the voltage across the inductive transducer will be directly proportional to the variation of inductance caused by the relative position of the magnets 68, 70 and the tubes 60, 60'. The inductor may be coupled to an oscillator circuit or other conventional sensing circuit.

If a three-terminal potentiometer transducer is desired, a constant voltage excitation may be impressed across the sense lines 62, 62'. If the drive lines 74, 74' are added to the embodiment of FIG. 3 to form a transformer type transducer, they are connected in phase opposition so that when the magnets 68,70 are positioned so that the centerline 28 bisects their length dimension $L_2$, a null output signal will result. As the magnets move in one direction or the other, the output signal varies from its null position and undergoes a phase reversal as the center of the magnets pass over the centerline 28.

The present invention is implemented in the embodiment of FIG. 3 so that the output signal represents the ratio of two temperatures. One temperature may be that of the area 76, which contains a temperature responsive device, such as the bimetal 78. The bimetal 78 is connected to a bracket 80, which is connected to a bifuricated coupling member 82 which has one arm 84 that is connected to the magnet 68 and a second arm 86 connected to the magnet 70. The arm 84 is supported by the support brace 88 while the arm 86 is supported by the support brace 90 so that the magnets 68, 70 move back and forth with respect to the tubes 60, 60' at substantially a constant distance from their outer peripheries.

The second temperature that is sensed by the sensor of FIG. 3 is the ambient temperature surrounding the tubes 60 and 60'. The inductance vs. temperature characteristics of the two tubes 60 and 60' are different, preferably due to the employment of different types of materials in each of the elements. The elements 60, 60' may be constructed of linear material, as contrasted to a square-loop material used in the device of the previously mentioned Bardash et al patent. One of the magnetic elements of the present invention may be constructed of a material that is commercially sold by the Ferroxcube Corporation under the name Ferroxcube 3E2A, and the other material may be made of Ferroxcube 3D3 material. The inductance of one of the two elements will be less than the other below a predetermined sensing temperature and will be greater than the inductance of the other element above the predetermined sensing temperature. At the predetermined desired sensing temperaure, the inductance of both elements are substantially equal. The inductively coupled sensing elements 60, 60', shown in the drawings of FIGS. 3 and 4, may have their sense wires 62, 62' connected to the terminals of a four-arm inductive bridge circuit, such as is shown in the abovementioned Sidor application.

An inductance vs. temperature plot for the cores 60, 60' of FIG. 3 is shown in FIG. 5 where the solid line curves 61, 61' represent the inductance vs. cross-over temperature characteristic of the cores 60, 60' of FIG. 3. It can be seen from this graph that the two curves 61, 61' may intersect at any of the intersection points 38, 39 or 41, which represent the cross-over temperatures T, T' or T'' that may be sensed by a conventional sensing circuit which senses when the induction of the two tubes 60, 60' are equal.

The cross-over temperature, $T_c$, may be sensed at the intersection point 38 of the curves 61, 61' of FIG. 5 when the magnets 68, 70 are positioned so that they are substantially bisected by the line 27. The magnets 68, 70 will completely saturate the portion of the magnetic core 60 that lies between them; but the other portions of the longitudinal elements 60, 60' will remain substantially unsaturated. The permanent magnets 68, 70 preferably have a length that is slightly shorter than the length of the substantially equal length magnetically saturable tubes 60, 60'. The cross-over temperature, $T_c$, that is sensed may thus be related to the temperature $T_a$ of the ambient area 76 which contains the bimetal 78 by the ratio R, where $R = Ta/Tc$, and the output signal from the tubes 60, 60' is proportional to R. This may occur since the bimetal 78 may be positioned so that it deflects in a way so that the coupling member will move the magnets 68, 70 to the right, as viewed in FIG. 3, as the temperature increases in the area 76.

The inductance of the tubes 60, 60' which have a ratio of $Ta/T$ when the magnets 68, 70 are bisected by the line 27, will have a ratio of $Ta/T'$ when they are moved to the right so that they are bisected by the center line 28 and $Tc = T'$. This means that as the temperature $Ta$ of the area 76 increases the cross-over temperature, Tc, which is sensed, also increases because the tube 60 preferably has a substantially constant, or decreasing, inductance vs. temperature characteristic while the tube 60' preferably has a rising inductance vs. temperature characteristic. Thus, as the magnets 68, 70 move to the right as the temperature $Ta$ increases the inductance of the tube 60 decreases, or remains substantially the same while the inductance of the tube 60' decreases resulting in a shift of the cross-over point, at which the inductances of the tubes 60 and 60' are substantially equal, from point 38 to point 39. Both elements 60, 60' are substantially equally affected by the magnets 68, 70 when they are bisected by the centerline 28.

If the temperature $Ta$ of the area 76 increases even more until the magnets 68, 70 are positioned so that the line 29 substantially bisets them, the inductance vs. temperture curves 61, 61' will be shifted so that they intersect at the point 41 where the still higher cross-over temperature $Tc = T''$ may be sensed. The ratio R, however, may be held relatively constant by proper design of the tubes 60, 60' and the bimetal 78 so that the output signal from the sensor may be utilized to indicate when the ambient temperature for the tubes 60, 60' is equal to the ambient temperature of the area 76 in order to control temperature equalization systems. Obviously, the sensor in FIG. 4 could also provide various other functions, including supplying an output signal that represents the product of two temperatures.

While the inductance of the curve 61' preferably increases with increasing temperature and the inductance of the curve 61' preferably either decreases or remains relatively constant, this is not a necessary requirement. Unlike the temperature compensating elements of the previously mentioned Bardash et al patent, it is not necessary for the permeability of one core to increase while the other core decreases, it being sufficient that the inductances vs. temperature characteristics of the two cores merely vary differentially so that they intersect at the desired temperature to be sensed.

FIG. 6 illustrates the output signal that results sensed when an A.C. sine wave signal is supplied to the sensors of FIG. 3. It is seen that when the temperature is below the cross-over temperature, the output signal 92 is of a first phase, but that the magnitude of the output signal decreases as the cross-over point 94 is approached. At the cross-over point 94 no reading will be obtained by a conventional null detector coupled to the sensor which indicates that the desired temperature has been reached. As the temperature increases beyond the sensed temperature at the cross-over point 94, the output signal 92 is of a phase which is opposite to the phase of the output signal 92 that is obtained for temperatures below the cross-over point 94 and it increases in magnitude as the temperature increases. Although a null detector is one suitable output detector for the present invention because of its simplicity, other type of detectors, including magnitude and phase responsive indicators, may also be employed, if desired.

The sensor of FIG. 4 may be identical to the sensor of FIG. 3 with the exception that the bimetal 78 in the area 76 is replaced by a pressure responsive device 96. The other elements operate in the same manner as those described with reference to FIG. 3 and hence, they have retained the same element numbers in FIG. 4. The pressure responsive device 96 of FIG. 4 replaces the temperature responsive bimetal 78 of FIG. 3 as the control element which governs the positioning of the magnets 68, 70. The pressure responsive device 96, for example, may be connected so that increasing ambient pressure in the area 98 surrounding the pressure responsive device causes the member 82 to push the magnets to the left, as viewed in FIG. 4, thereby providing an output signal which is proportional to the pressure P in the surrounding area 76 and the cross-over temperature, Tc.

A sensing circuit is shown in FIG. 7 which may incorporate the sensor of FIGS. 3 or 4 and which may be positioned at a remote location from the remaining portion of the circuitry of FIG. 7. An oscillator 140 of the Colpits type is used to supply an A.C. signal. The oscillator employs the transistor 147, the frequency determining coil 149, the frequency determining capacitors 144, 146, the coupling capacitors 148, 150, the decoupling capacitor 152 and the resistors 154, 156, 158. The collector 160 of the transistor 147 is connected to the terminal 162 which is coupled to a positive voltage supply. The base 164 of the transistor 147 is coupled to the junction of the bias resistors 154, 156 and the coupling capacitor 148. The other end of the resistor 154 is connected to the terminal 162, while the other end of the resistor 156 is connected to a ground at the terminal 163. The resistor 158 is connected between the emitter 166 of the transistor 147 and ground at the terminal 163. The output of the oscillator 140 at the emitter 166 of the transistor 147 is coupled through the coupling capacitor 150 to the primary winding 168 of the output transformer 170. The secondary windings 172, 174 of the output transformer 170 are coupled into a bridge circuit 175 in which the magnetic elements 60, 60', and their associated magnets 63, 70, of FIGS. 3 and 4 form the active elements. The polarity of the windings 168, 172 and 174 of the transformer 170 and of the magnetic tubes 60, 60' are shown in FIG. 7 by means of dots in which the dots indicate a like polarity for each winding of magnetic element so marked.

The output of the bridge circuit 175 is coupled to a primary winding 176 of the transformer 178. One end of the primary winding 176 is connected to the junction point 177 of the tubes 60, 60' and the other end is connected to the junction point 179 of the winding 172, 174. The secondary winding 180 of the output transformer 178 has a center tap grounded terminal 181 and is coupled through a pair of resistors 182, 184 to a synchronous detector circuit 186 which is made up of four interconnected diodes 188, 190, 192 and 194, as shown in FIG. 7. The transformer 178 could be omitted, if desired, by connecting junction points 177, 179 directly to the resistors 182, 184.

The junction 196 between the diodes 188 and 194 is connected to the junction of the coupling capacitor 150 of the oscillator 140 and one end of the primary winding 168 of the transformer 170. The junction 198 between the diodes 190 and 192 is connected to the noninverting input terminal 200 of a differential amplifier 202. A capacitor 204 is connected between the noninverting input terminal 200 and ground in order to smooth out input signal to obtain a more constant D.C. level. The resistor 205 is connected between the inverting input terminal and ground to "bleed off" or discharge the charge stored by the capacitor 204. The inverting input terminal of the amplifier 202 is connected directly to ground. Thus, an input signal from the oscillator 140 is impressed across the terminals 196, 198, while the signal from the bridge circuit 175 is impressed across the terminal 208 at the junction of the diodes 188, 190 and the terminal 210 at the junction of the diodes 192, 194 of the synchronous detector 186. The terminals 208, 210 are also connected to the resistors 182 and 184, respectively.

The graph of FIGS. 8 and 9 respectively shows the voltage vs. cross-over point characteristic of the circuit at the noninverting input terminal 200 and at output terminal 212. If the ambient temperature around the tubes 60, 60' is less than the cross-over point 214, where the curve of FIG. 8 crosses the voltage axis, the inductance of the tube 60 will be substantially smaller than the inductance of the tube 60'. In this case, a relatively large positive voltage will appear on the junction point 208 and a relatively large negative voltage will appear on the junction point 210 simultaneously with the appearance of a positive voltage on the terminal 196 that is somewhat greater than the positive voltage on the terminal 208. The diode 194 will thus be forward biased and the cathode of the diode will be a positive voltage level since the junction point 196 is directly connected to the junction point 197 while the junction points 208, 210 are coupled to the secondary winding 180 through the resistors 182, 184. The positive voltage on the cathode of the diodes 188, 192 reverse biases these diodes. Thus, only the diode 190 is forward biased by the positive voltage on the terminal 208 so as to charge the capacitor 204 and to supply current into the noninverting input terminal 200 of the amplifier 202. With current flowing into the noninverting input terminal 200, the voltage on the output terminal 212 of the amplifier 202 will be at a high level, as shown in FIG. 8.

When a negative voltage is present on the terminal 196 and a negative voltage is present on the terminal 208 with a positive voltage present on the terminal 210, there will be no substantial conduction through any of the diodes of the synchronous detector 186. Thus, current flows through the diode 190 into the input terminal 200 only during one half cycle of oscillation of the oscillator 140.

As the temperature changes so that the inductances of the tubes 60, 60' become equal, the voltage supplied by the winding 180 across the terminals 208, 210 drops substantially to zero. Thus, current will continue to flow through the forward biased diode 194, but the diode 190 will not conduct. The voltage at the junction 198 is shown in the temperature vs. voltage characteristic of FIG. 8a where the point 214 is the point at which the voltage drops to substantially zero, when the inductances of the tubes 60, 60' are equal. Without current flow into the input terminal 200 of the amplifier 202 the amplifier will change status so that a sharp transition of the voltage at the terminal 212 to a low level occurs at the point 214, as shown in FIG. 8b of the drawings.

If the temperature continues to increase the inductance of the core 60' becomes less than the inductance of the core 60, then when the voltage at the junction 210 is positive and the voltage at the junction 208 is negative, the voltage at the junction 196 will be positive. In this instance, all of the diodes 188, 190 and 192 will be reversed biased while only the diode 194 may be forward biased. As the junction 196 becomes negative, however, the voltage on the junction 208 becomes positive with respect to the voltage on the junction 210. The diodes 188 and 192 will then become forward biased, and this will bring the anode of the diode 192 to a negative voltage level. Thus, for temperatures greater than the temperature at the cross-over point 214 the output terminal 212 will be at a low level as shown in FIG. 8b.

As the temperature reaches the cross-over point 214 from a lower temperature any position voltage stores across the capacitor 204 will be drained off through the diode 192. Similarly, as the temperature reaches the cross-over point 214 from a higher temperature any negative voltage stored across the capacitor will be drained off through the diode 190. Thus, the transition on the output terminal 212 of the amplifier 202 at the cross-over point 214 will be delayed for a short time as any accumulated charge on the capacitor 204 is discharged.

What is claimed is:

1. A sensing device comprising first and second inductively wound magnetic cores having different inductance vs. ambient temperature characteristics so that the inductance vs. ambient temperature characteristics of the two cores intersect at a temperature which is to be sensed, a source of voltage coupled to said inductively wound cores, sensing means coupled to said cores to detect when said inductances of said cores are approximately equal, permanent magnet means positionable adjacent said cores, and a pressure responsive control means responsive to a pressure condition for positioning said magnet means relative to said cores.

2. A sensor as claimed in claim 1 wherein each of said cores comprises an elongated, hollow tube having an elongated axis and constructed of material which is magnetically saturable, an electrical conductor means comprising at least one sense wire passing through each of said tubes in a direction parallel to said elongated axis of said tubes and said permanent magnet means comprises a pair of opposite magnetic poles that are positioned adjacent the outer periphery of said tubes and which substantially completely magnetically saturate the portions of said tubes that are disposed intermediate said magnetic poles, but which are substantially ineffective in magnetically saturating the remaining portions of said tubes.

* * * * *